United States Patent [19]
Tobin et al.

[11] Patent Number: 5,751,735
[45] Date of Patent: May 12, 1998

[54] INTEGRATED DEBUG TRIGGER METHOD AND APPARATUS FOR AN INTEGRATED CIRCUIT

[75] Inventors: Paul G. Tobin, Fort Collins; Hosein Naaseh-Shahry, Windsor; Stephen R. Undy, Fort Collins, all of Colo.

[73] Assignee: Hewlett-Packard Company, Palo Alto, Calif.

[21] Appl. No.: 749,188

[22] Filed: Nov. 14, 1996

[51] Int. Cl.$^6$ .................................................. G06F 11/27
[52] U.S. Cl. ........................... 371/22.5; 395/183.06
[58] Field of Search ........................ 371/22.5, 22.32, 371/27.5; 395/183.01, 183.06, 183.21, 183.08, 500, 182.01, 183.03, 183.04, 183.07, 183.1, 183.11, 735; 364/550, 580, 578; 324/765

[56] References Cited

U.S. PATENT DOCUMENTS

| | | | |
|---|---|---|---|
| 4,910,417 | 3/1990 | El Gamal et al. | 307/465 |
| 5,084,814 | 1/1992 | Vaglica et al. | 395/325 |
| 5,317,711 | 5/1994 | Bourekas et al. | 395/425 |
| 5,383,192 | 1/1995 | Alexander | 371/16.2 |
| 5,418,452 | 5/1995 | Pyle | 324/158.1 |
| 5,473,754 | 12/1995 | Folwell et al. | 395/183.21 |
| 5,488,688 | 1/1996 | Gonzales et al. | 395/183.1 |
| 5,491,793 | 2/1996 | Somasundaram et al. | 395/183.21 |
| 5,515,530 | 5/1996 | Eskandari | 395/180 |
| 5,560,036 | 9/1996 | Yoshida | 395/800 |
| 5,590,354 | 12/1996 | Klapproth et al. | 395/800 |
| 5,617,420 | 4/1997 | Whetsel | 370/402 |
| 5,630,102 | 5/1997 | Johnson et al. | 395/500 |

Primary Examiner—Robert W. Beausoliel, Jr.
Assistant Examiner—Nadeem Iqbal

[57] ABSTRACT

Presented is an internal integrated debug trigger apparatus for use in debugging functional and electrical failures of an integrated circuit chip. The debug trigger apparatus includes a plurality of software programmable trigger registers and a plurality of software programmable trigger function blocks. Each trigger register monitors a plurality of integrated circuit signals which may include signals sent to the external pins of the integrated circuit and signals present internal to the chip. If the value of the monitored signals matches the programmed trigger condition, the trigger register produces a trigger match signal. Each trigger function block receives a combination of the trigger match signals generated by the trigger registers and each computes its programmed boolean minterm function on its inputs. Each trigger function block produces a trigger capture signal which may be true or false according to the computed function of the inputs. The debug trigger may also include a programmable iteration counter which allows for repetition of a trigger condition before it is provided external to the chip. The output of the iteration counter may be connected as input to one or more of the other trigger registers to allow for different start and end conditions.

17 Claims, 8 Drawing Sheets

| DIAGNOSE REGISTER | DESCRIPTION |
|---|---|
| DR0 | IATOR (INSTRUCTION ADDRESS TRIGGER OFFSET) |
| DR1 | IATOER (INSTRUCTION ADDRESS TRIGGER OFFSET ENABLE) |
| DR2 | IATSIR (INSTRUCTION ADDRESS TRIGGER SPACE ID) |
| DR3 | IATSIER (INSTRUCTION ADDRESS TRIGGER SPACE ID ENABLE) |
| DR4 | IATRPNR (INSTRUCTION ADDRESS TRIGGER RPN) |
| DR5 | IATRPNER (INSTRUCTION ADDRESS TRIGGER RPN ENABLE) |
| DR6 | DATOR (DATA ADDRESS TRIGGER OFFSET) |
| DR7 | DATOER (DATA ADDRESS TRIGGER OFFSET ENABLE) |
| DR8 | DATSIR (DATA ADDRESS TRIGGER SPACE ID) |
| DR9 | DATSIER (DATA ADDRESS TRIGGER SPACE ID ENABLE) |
| DR10 | LITR (LIH INSTRUCTION TRIGGER) |
| DR11 | LITER (LIH INSTRUCTION TRIGGER ENABLE) |
| DR12 | RITR (RIH INSTRUCTION TRIGGER) |
| DR13 | RITER (RIH INSTRUCTION TRIGGER ENABLE) |
| DR14 | TP (ARBITRARY FUNCTION MINTERM SELECTOR) |
| DR15 | IC (ITERATION COUNTER) |
| DR16 | CT (COUNTDOWN TIMER) |
| DR17 | CR (TRIGGER CONTROL REGISTER) |

*FIG. 7*

INTEGRATED DEBUG TRIGGER METHOD AND APPARATUS FOR AN INTEGRATED CIRCUIT

FIELD OF THE INVENTION

The present invention relates generally to debugging techniques for integrated circuits, and more particularly, to a system and method for debugging functional and electrical failures of an integrated circuit chip using an internal integrated debug trigger apparatus.

BACKGROUND OF THE INVENTION

Integrated circuit technology has experienced a tremendous growth in the ability to provide ever increasing functional complexity in smaller and smaller integrated circuit packages. The rapid advances in integrated circuit technology provide many benefits. One such benefit is the rapid increase in computer system performance due in part to the decreased distance signals must travel within the system. Another benefit experienced by heavily integrated circuits is increased noise immunity due to fewer non-integrated system components.

In the field of integrated circuit testing and debugging, however, new problems have arisen. In the past, integrated circuits came in package sizes which had external pins large enough in size and spacing to facilitate connection to external "samplers" for signal monitoring. The signals on the external pins could therefore be input to a logic analyzer, oscilloscope, or other test equipment to monitor and test signals of interest. With smaller package sizes, however, have come fewer, smaller external pins which are often so close together that it becomes harder to sample at higher frequencies, making it impractical to make clean connections for use by external test equipment. A need has arisen, therefore, for an alternative method for extracting and monitoring integrated circuit signals in the process of testing and debugging integrated circuits.

With the increased density of circuit integration has come an increasing number of system signals which remain internal to the integrated circuit chip and which therefore remain inaccessible via external pins of the chip. The inaccessibility of internal chip signals causes great difficulty in locating functional and electrical failures in the integrated circuit during the testing and debugging process. With only the external pins available for monitoring, many functional and electrical problems of the integrated circuit are hidden because the root of the problem may be seen only at the internal signal level. A need exists, therefore, for a method of making accessible the internal signals of an integrated circuit for use in system testing and debugging.

The testing and debugging process of an integrated circuit chip typically involves monitoring a particular signal or set of signals to ensure that they meet certain criteria. One common and effective method of testing includes the setting of trigger capture events. A trigger capture event is typically configured to capture a signal or set of signals which occur after a specified event, or trigger, occurs. The capturing of signal values which occur after a trigger condition is often invaluable in debugging integrated circuit functional logic failures. Captured events may be compared to expected events which should have occurred after the trigger condition occurs. More sophisticated testing and debugging tools, such as logic analyzers, provide the capability for setting multiple trigger capture conditions, and allow repetition and different start and end conditions. With the difficulty in obtaining clean external signals and the inaccessibility of internal signals, the usefulness of external test and debug tools, however, is limited. A need exists, therefore, for a technique for providing the sophisticated functionality of powerful external debug tools to difficult-to-access external and inaccessible internal signals of an integrated circuit.

The testing and debugging of integrated circuits may involve verification of both functional logic and electrical timing. The test equipment required for verifying the functional logic of the integrated circuit may be different than that required for verifying its electrical timing. Specifically, functional logic verification requires the ability to capture pipelined signal patterns and match them to expected results. Electrical timing verification, on the other hand, requires the ability to measure the timing between signals as they occur rather than between pipeline steps. Often, verification of these two different criteria is performed using different test equipment, as for example, both a logic analyzer for a functional logic verification and debug tool and an oscilloscope for an electrical timing verification and debug tool. In creating a debug tool, it would therefore be desirable to provide the capability of testing and debugging both the functional logic and the electrical timing of an integrated circuit.

Accordingly, an object of the invention is to provide a sophisticated low-cost trigger debug apparatus which greatly simplifies precision pin-pointing of integrated circuit problems and failures. Another object of the invention is to provide a method and apparatus for extracting and monitoring integrated circuit signals in the process of testing and debugging integrated circuits. Another object of the invention is to provide a method for making accessible the internal signals of an integrated circuit for use in system testing and debugging. Yet another object of the invention is to provide a technique for applying the sophisticated functionality of powerful external debug tools to difficult-to-access external and inaccessible internal signals of an integrated circuit. Still another object of the invention is to provide a tool for testing and debugging both the functional logic and the electrical timing of an integrated circuit.

SUMMARY OF THE INVENTION

In accordance with a preferred embodiment of the invention, an apparatus for use in debugging functional and electrical failures of an integrated circuit chip using an internal integrated debug trigger apparatus is presented. The debug trigger apparatus resides internal and integral to the integrated circuit chip and includes a plurality of software programmable trigger registers and a plurality of software programmable trigger function blocks. Each trigger register monitors a plurality of integrated circuit signals which may include signals sent to the external pins of the integrated circuit and signals present internal to the chip. If the value of the monitored signals matches the programmed trigger condition, the trigger register produces a trigger match signal. Each trigger function block receives a combination of the trigger match signals generated by the trigger registers and each computes its programmed boolean minterm function on its inputs. In the preferred embodiment, the boolean minterm is computed by performing a bit-wise logical AND of all possible boolean combinations of the input trigger match signals and their complements with a programmed bit mask supplied by a programmable function, and then performing a bit-wise logical OR of bits in the bit-wise AND result to produce the trigger capture signal. Each trigger function block produces a trigger capture signal which may be true or false according to the computed function of the inputs.

In the preferred embodiment, the trigger registers include an instruction address trigger register which receives and monitors instruction fetches from an instruction memory address and produces an instruction address trigger match signal, a data address trigger register which receives and monitors data accesses to a data memory address and produces a data address trigger match signal, and an instruction data trigger register which receives and monitors an instruction pattern on an instruction bus and produces an instruction data trigger match signal. The preferred embodiment also includes an iteration counter responsive to a programmable iteration count command for setting an iteration count. The iteration counter is connected to receive a trigger capture signal from one of the trigger function blocks and is configured to keep track of an iteration number indicating a number of times its input trigger capture signal is received. The iteration counter produces an iteration count enable signal when the iteration number reaches the iteration count. The iteration count enable signal may be connected as input to one or more of the plurality of trigger function blocks to provide the ability to define different start and end conditions. The preferred embodiment also includes a countdown timer which is responsive to a programmable countdown time command for setting a clock cycle count. The countdown timer is connected to receive a trigger capture signal from one of the plurality of trigger function blocks. The countdown timer is configured to keep track of a clock cycle number indicating a number of clock cycles which pass since its input trigger capture signal is received, and produces a countdown timer enable signal when the clock cycle number equals the clock cycle count.

BRIEF DESCRIPTIONS OF THE DRAWINGS

The objects and advantages of the invention will become more apparent and more readily appreciated from the following detailed description of the presently preferred exemplary embodiment of the invention taken in conjunction with the accompanying drawings, of which:

FIG. 7 is a table of diagnose registers implemented in the preferred embodiment for programming each of the trigger registers, trigger functional blocks, and iteration and countdown timers.

DETAILED DESCRIPTION OF THE PRESENT INVENTION

The preferred embodiment of the present invention is discussed below with reference to the drawings, where like reference numbers represent like elements.

Figure 1:
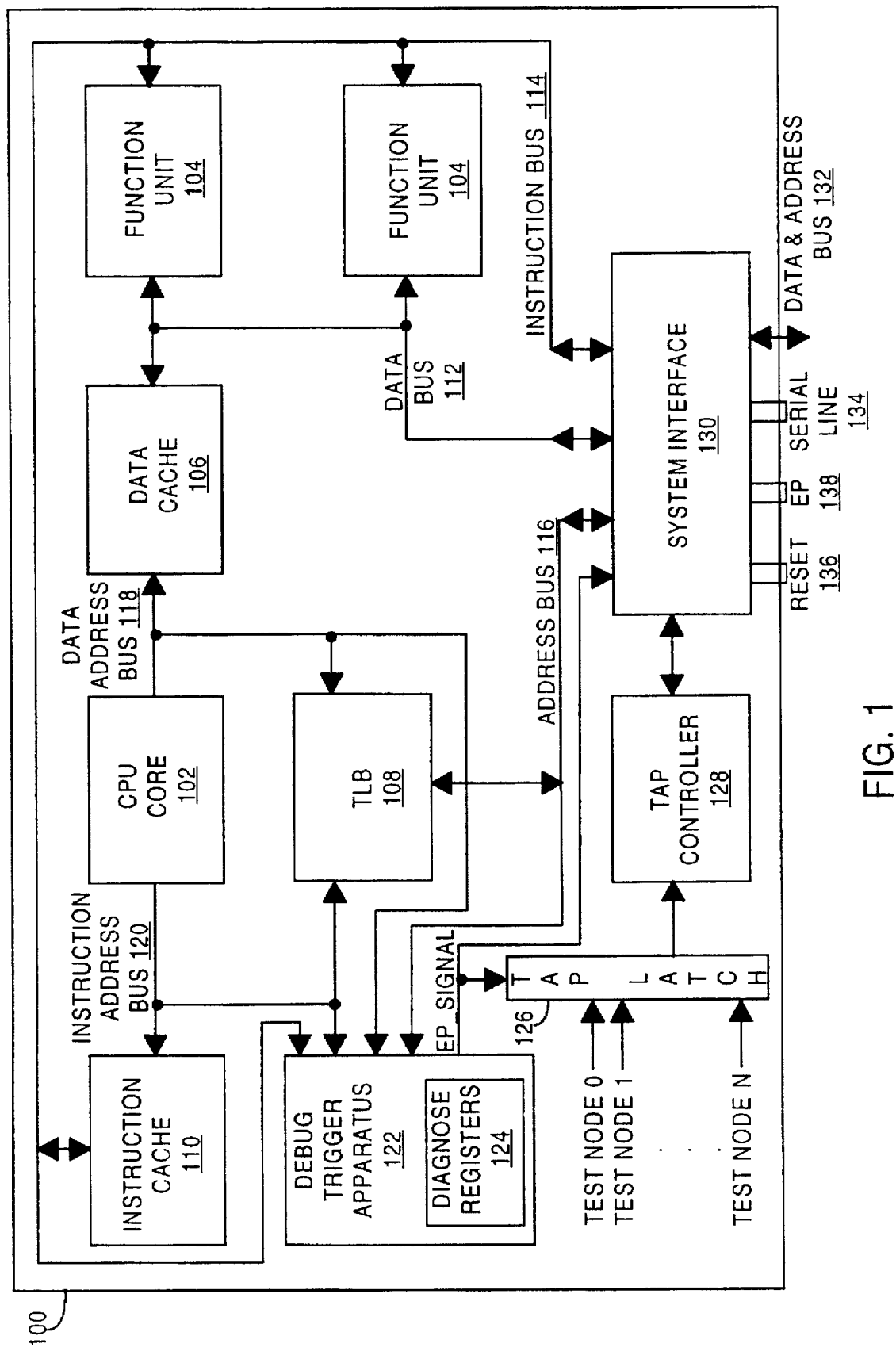
FIG. 1 is a high-level block diagram of an integrated circuit in which the present invention resides.

FIG. 1 is a high-level block diagram of an integrated circuit chip 100 in which the present invention is incorporated. The preferred embodiment of the present invention is discussed in the context of an integrated circuit 100 which implements a microprocessor architecture because the microprocessor architecture contains features which are ideally suited to illustrating the inventive principles of the invention. Although representative of the type of integrated circuit in which the present invention may be utilized to test and debug the integrated circuit, the microprocessor architecture of integrated circuit 100 is not intended in any way to limit the use of the present invention. Accordingly, the integrated circuit to which the present invention may be applied may include any other integrated circuit of interest. The integrated circuit 100 shown in FIG. 1 is a model of the computer architecture of the PA-7300LC RISC chip, manufactured by Hewlett-Packard Company, Palo Alto, Calif.

As shown in FIG. 1, integrated circuit 100 includes a central processing unit (CPU) 102. The CPU 102 receives instructions and executes them. Depending on the instruction, the CPU may delegate certain work to be completed to special function units 104. Special function units are dedicated hardware units optimally designed to perform a given function. The use of special function units substantially increases the performance of a processor.

The integrated circuit 100 shown in FIG. 1 also includes an instruction cache 110 and data cache 106. Instruction fetches and data accesses each require access to data from a main memory external to the integrated circuit 100. In the integrated circuit 100 shown in FIG. 1, all instructions executed by the CPU 102 are first moved from main memory into the instruction cache 110 and all data accessed by the CPU 102 is first moved from main memory into the data cache 106. Move-in rules are known in the art. Typically, whenever a request for access to a given data item is issued and the cache does not contain the requested data item, the entire cache line (i.e., block of data) in main memory where the requested data item resides is moved into the cache at the same time. Most modern computer systems also support virtual addressing. To support virtual addressing, a translation lookaside buffer (TLB) is typically used to provide virtual to absolute address translations. As shown in FIG. 1, the integrated circuit includes a TLB 108 which is a shared data/instruction fetch resource. In operation, the CPU 102 requests a memory address to be accessed on either an internal instruction address bus 120 or an internal data address bus 118. The TLB holds the virtual to real address mappings. When presented with a virtual address, it attempts to find the corresponding physical address (real address). On failing to do so, special hardware or software is invoked to place such a translation into the TLB. This is called a "TLB hit" or "TLB miss". Once a physical address is determined, the cache is checked to see if that line of data from physical memory is present in the cache. If so, it is a "cache hit" and the data or instruction is immediately available. If not, it is a "cache miss" and the data or instruction must be retrieved from memory. Instructions are sent to the instruction cache 110 on an internal instruction bus 114 and data is sent to the data cache 106 on an internal data bus 112. From the above discussion, it is clear that the signals on the internal instruction address bus 120, data address bus 118, instruction bus 114, data bus 112, and TLB address bus 116 are inaccessible external to the integrated circuit 100 via the system interface 130.

The integrated circuit 100 also includes a debug trigger apparatus 122 which contains the heart of the invention. The debug trigger apparatus 122 may receive various signals of interest which are present on nodes located throughout the integrated circuit depending on the integrated circuit design. Accordingly, it may be deemed interesting in the integrated circuit 100 to make available the signals of each of the internal busses of the integrated circuit 100. Thus, as shown in FIG. 1, the debug trigger apparatus 122 is configured to receive signals present on each of the instruction bus 114, instruction address bus 120, data address bus 118, and TLB address bus 116. The debug trigger apparatus 122 includes diagnose registers 124 which may be programmed to set up a variety of trigger capture events, including multiple trigger events, repetitive events, different starting and ending conditions, and arbitrary clock signal delays before triggering. The debug trigger apparatus produces one or more trigger capture signals depending on how it is configured. The trigger capture signals may be used for various functions including to signal an external pulse or cause a hardware breakpoint trap. In the preferred embodiment, a trigger capture signal EP_SIGNAL is used to latch a test access port (TAP) latch 126 and to signal an external pulse on an external pin EP 138. The TAP latch 126 is coupled to various test nodes TEST NODE 0–TEST NODE N throughout the integrated circuit 100. When an external test system receives the EP_SIGNAL on the external pin EP 138, it may serially download the contents of the TAP latches 126 via a serial line 134 with the assistance of a TAP controller 128. In the preferred embodiment, the TAP controller 128 and external serial TAP retrieval hardware (not shown) conform to the well-known Institute of Electrical and Electronics Engineers (IEEE) Standard 1149.1, "Test Access Port and Boundary Scan Architecture," also known as the Joint Test Action Group (JTAG) standard.

Figure 2:
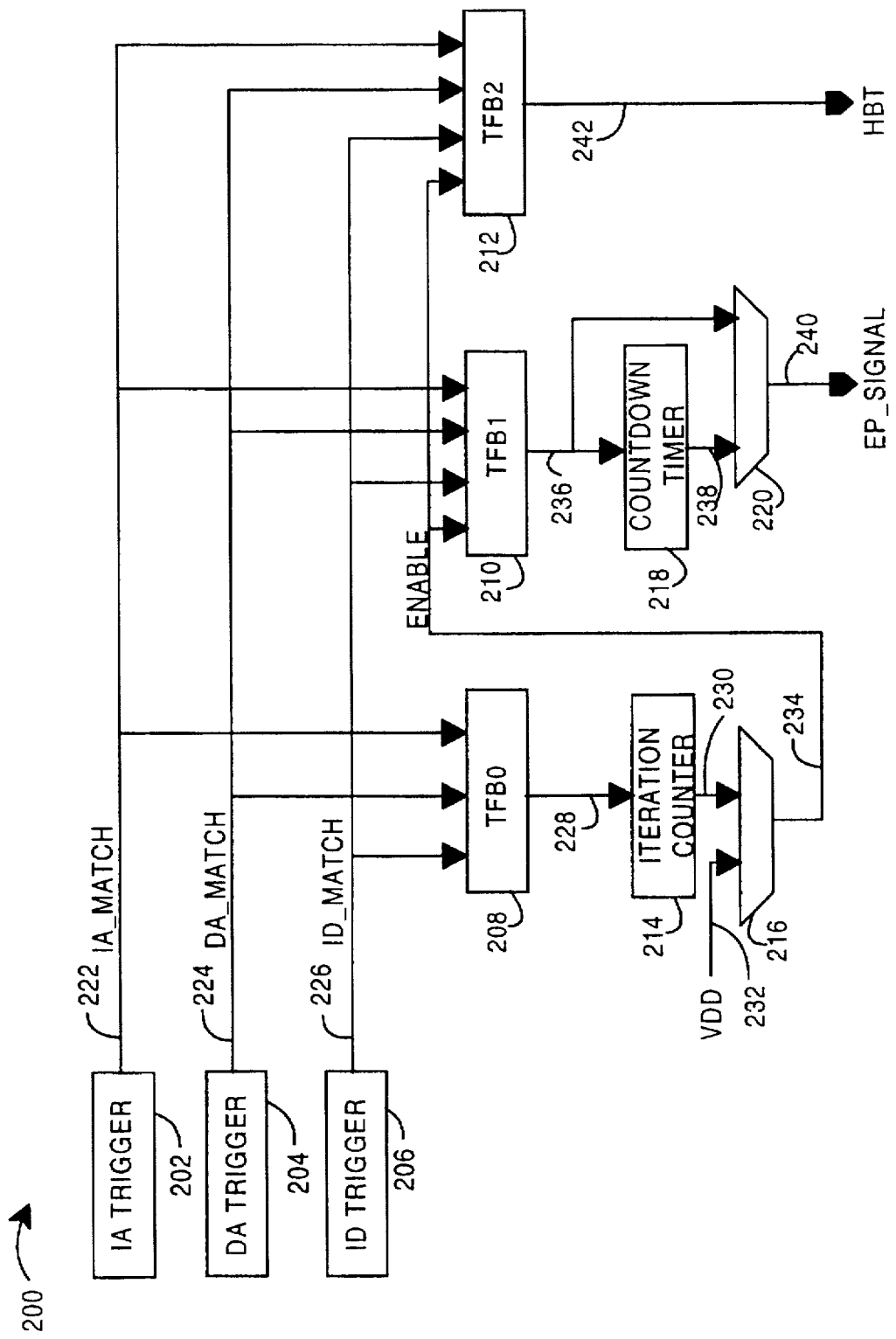
FIG. 2 is a block diagram of a debug trigger apparatus in accordance with the preferred embodiment of the present invention.

FIG. 2 is a block diagram of a preferred embodiment debug trigger apparatus for the integrated circuit 100 of FIG. 1 in accordance with the present invention. As shown in FIG. 2, the debug trigger apparatus, shown generally at 200, includes an instruction address (IA) trigger register 202, a data address (DA) trigger register 204, and an instruction data (ID) trigger register 206. The instruction address trigger register 202 is configured to monitor the internal instruction address bus 120 and look for instruction fetches from a memory address designated by the programmed value of the instruction address trigger register 202. When an instruction is fetched from a memory address which matches the programmed value of the instruction address trigger register 202, the instruction address trigger register 202 produces an instruction address trigger match signal 222. The data address trigger register 204 is configured to monitor the internal data address bus 118 and look for data accesses to and from a memory address designated by the programmed value of the data address trigger register 204. When data is accessed at a memory address which matches the programmed value of the data address trigger register 204, the data address trigger register 204 produces a data address trigger match signal 224. The instruction data trigger register 206 is configured to monitor the internal instruction bus 114 and look for an instruction pattern designated by the programmed value of the instruction data trigger register 206. When an instruction pattern is detected which matches the programmed value of the instruction data trigger register 206, the instruction data trigger register 206 produces an instruction data trigger match signal 226.

Figure 3:
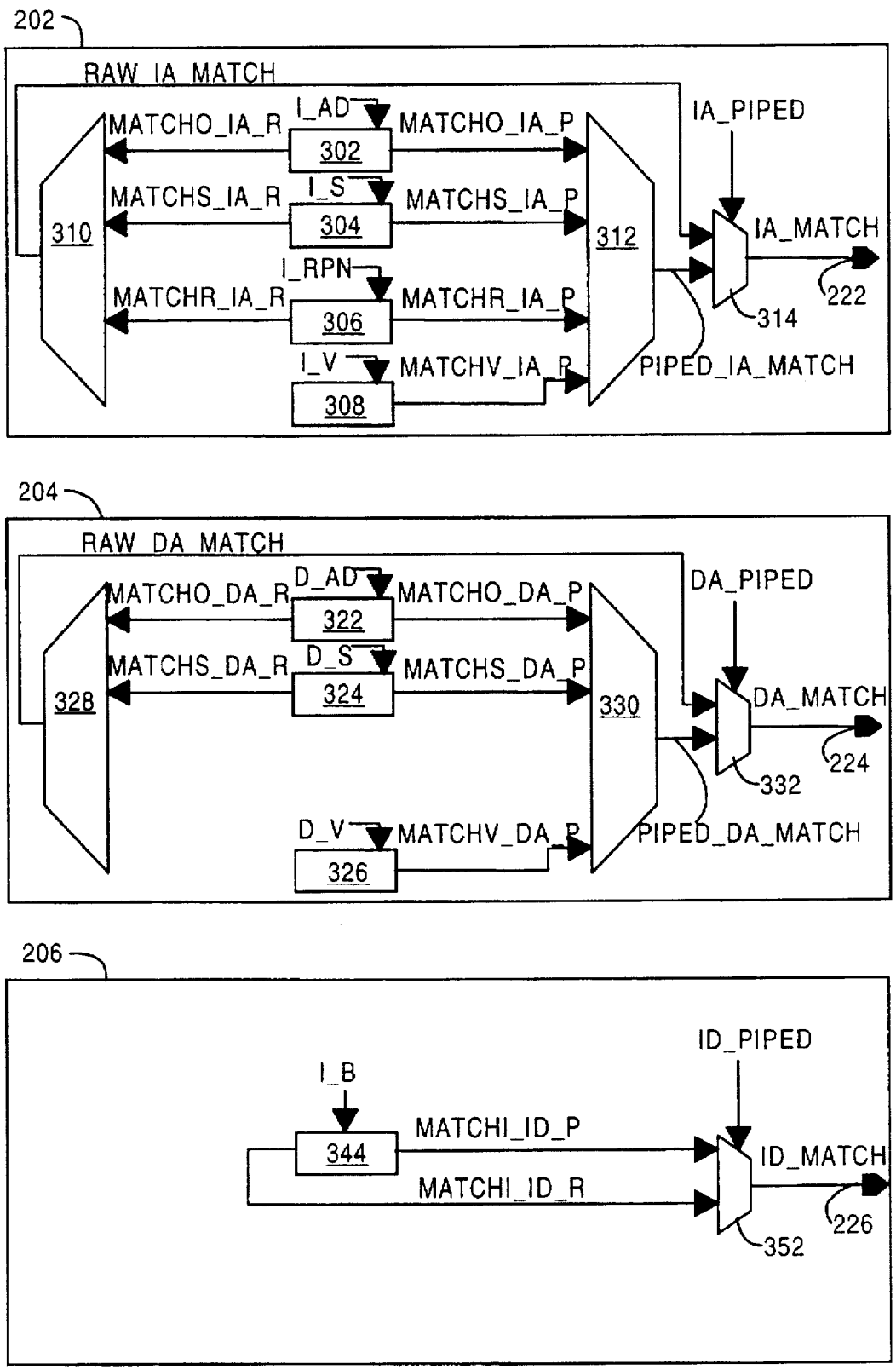
FIG. 3 is a more detailed block diagram of the instruction address register, data address register and instruction trigger register of the preferred embodiment debug trigger apparatus of FIG. 2.

FIG. 3 is a more detailed block diagram of the instruction address register 202, data address register 204 and instruction trigger register 206 of the preferred embodiment debug trigger apparatus 200 of FIG. 2. As shown in FIG. 3, the instruction address trigger register 202 comprises an instruction trigger offset data block 302, an instruction trigger space id data block 304, an instruction trigger real page number data block 306 and an instruction trigger virtual mode data block 308. The instruction address trigger register 202 also includes a raw match signal multiplexor 310 which receives a raw trigger match signal MATCH0_IA_R, MATCHS_IA_R, MATCHR_IA_R respectively from instruction trigger offset data block 302, instruction trigger space id data block 304, and instruction trigger real page number data block 306. The instruction address trigger register 202 also includes a pipelined match signal multiplexor 312 which receives a pipelined trigger match signal MATCH0_IA_P, MATCHS_IA_P, MATCHR_IA_P, MATCHV_IA_P respectively from instruction trigger offset data block 302, instruction trigger space id data block 304, instruction trigger real page number data block 306, and instruction trigger virtual mode data block 308. The instruction address trigger register 202 also includes a multiplexor 314 which receives a RAW_IA_MATCH signal from multiplexor 310 and a PIPED_IA_MATCH signal from multiplexor 312. The multiplexor 314 also receives a programmable select signal IA_PIPED which controls whether the RAW_IA_MATCH signal or the PIPED_IA_MATCH signal is output as the instruction address trigger match signal IA_MATCH 222.

As also shown in FIG. 3, the data address trigger register 204 comprises a data trigger offset data block 322, a data trigger space id data block 324, and a data trigger virtual mode data block 326. The data address trigger register 204 also includes a raw match signal multiplexor 328 which receives a raw trigger match signal MATCH0_DA_R, MATCHS_DA_R, respectively from data trigger offset data block 322, and data trigger space id data block 324. The data address trigger register 204 also includes a pipelined match signal multiplexor 330 which receives a pipelined trigger match signal MATCH0_DA_P, MATCHS_DA_P, MATCHV_DA_P respectively from data trigger offset data block 322, data trigger space id data block 324, and data trigger virtual mode data block 326. The data address trigger register 204 also includes a multiplexor 332 which receives a RAW_DA_MATCH signal from multiplexor 328 and a PIPED_DA_MATCH signal from multiplexor 330. The multiplexor 332 also receives a programmable select signal DA_PIPED which controls whether the RAW_DA_MATCH signal or the PIPED_DA_MATCH signal is output as the data address trigger match signal DA_MATCH 224.

As also shown in FIG. 3, the instruction trigger register 206 comprises an instruction trigger block 342. The instruction trigger register 206 also includes a multiplexor 352 which receives a raw trigger match signal MATCHI_ID_R and a pipelined trigger match signal MATCHI_ID_P from the instruction trigger block 342. The multiplexor 352 also receives a programmable select signal ID_PIPED which controls whether the MATCHI_ID_R signal or the MATCHI_ID_P signal is output as the instruction address trigger match signal ID_MATCH 226.

Figure 4:
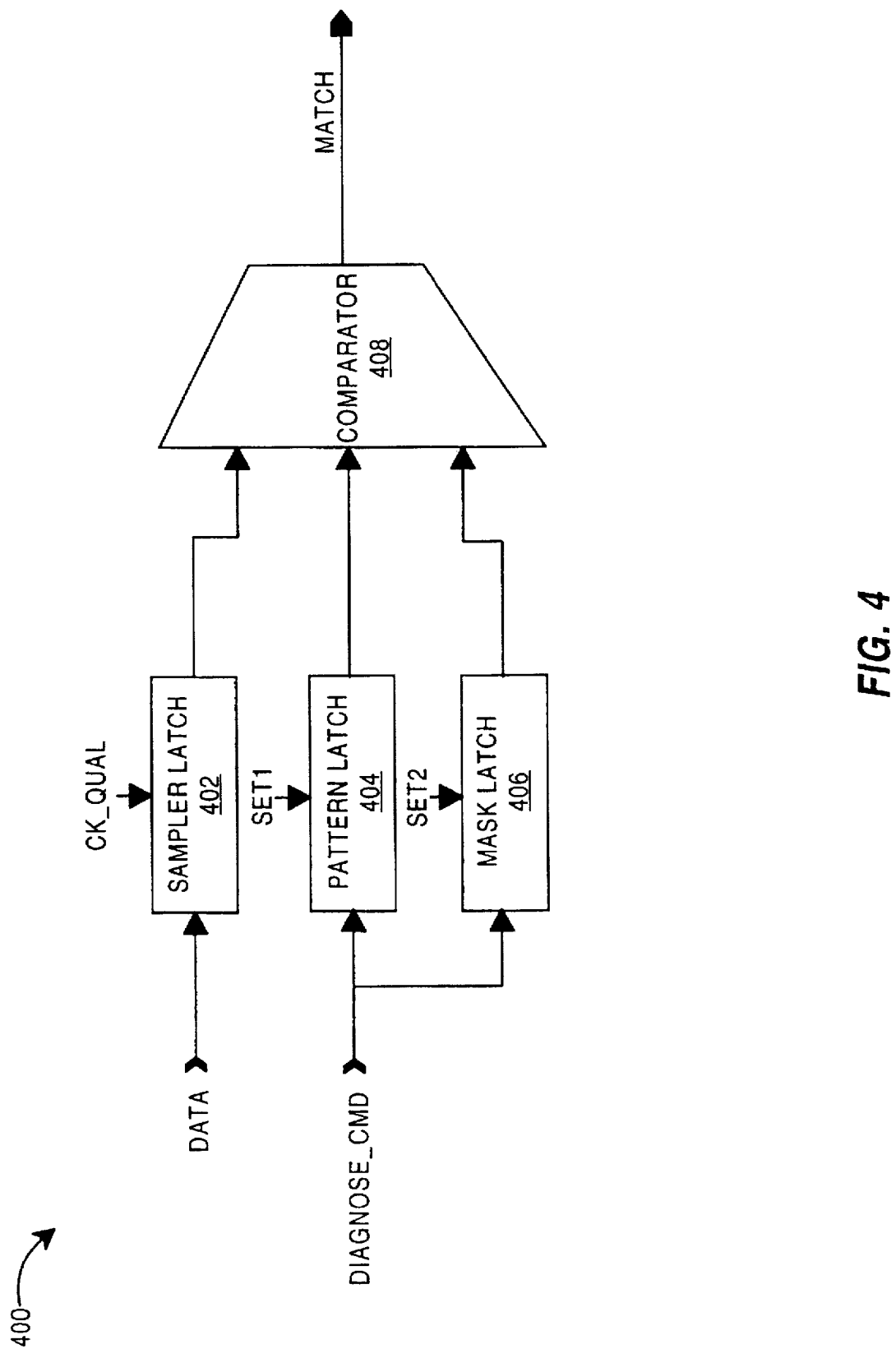
FIG. 4 is a block diagram of a trigger register block used in the implementation of the trigger registers in the preferred embodiment shown in FIG. 3.

FIG. 4 is a more detailed block diagram of a trigger register block 400 used to implement the instruction trigger offset data block 302, instruction trigger space id data block 304, instruction trigger real page number data block 306 of instruction address trigger register 202, the data trigger offset data block 322, data trigger space id data block 324 of data address trigger register 204, and instruction trigger block 342 of instruction trigger register 206. As shown in FIG. 4, each trigger register block includes a sampler latch 402, a pattern latch 404 and a mask latch 406. The sampler latch 402 is coupled to receive as incoming DATA the signals of the particular bus that it is configured to monitor. As an example, the sample latch 402 of the instruction trigger offset data block 302 is connected to receive the portion of the instruction address bus 120 associated with the address offset, while the sample latch 402 of the instruction trigger space id block 304 is connected to receive the portion of the instruction address bus 120 associated with the space id of the instruction address. The sampler latch is clocked by a qualified clock signal CK_QUAL which may be programmed to enable sampling on each CPU clock cycle or may be programmed to enable sampling in synch with a CPU pipeline signal. The pattern latch 404 is coupled to receive a diagnostic command on DIAGNOSE_CMD which sets a pattern on which to trigger. The mask latch 406 is coupled to receive a diagnostic command on DIAGNOSE_CMD which sets a bit mask to enable a pattern range to be set up. The pattern latch 404 and mask latch 406 are set when signals SET1 and SET2 respectively are pulsed high. The comparator 408 receives the contents of each of the latches 402–406 and performs a bit-wise compare of the sample to the pattern for each bits not masked out by the mask. If the sample matches the masked pattern, the comparator signals a match signal MATCH.

The debug trigger apparatus 200 of FIG. 2 also includes a trigger functional block 0 (TFB0) 208, a trigger functional block 1 (TFB1) 210, and a trigger functional block 2 (TFB2) 212. In the preferred embodiment shown in FIG. 2, each of the trigger functional blocks 208–212 receive each of the instruction address trigger match signal 222, data address trigger match signal 224, and instruction data trigger match signal 226. Each of the trigger functional blocks 208–212 are programmable and form an arbitrary function of their inputs. In the preferred embodiment, the programmed functions are performed by computing each boolean minterm of the inputs, performing a logical AND of each minterm with a software programmed mask, and performing a logical OR of the logical AND results to produce respective trigger functional block signals 228, 236, and 242. Generally, the software programmed mask for each trigger functional block 208–212 is programmed by sending a command to the integrated circuit 100 on the data and address bus 132. Accordingly, the integrated circuit 100 must have the ability to recognize and process the trigger functional block program commands. In the integrated circuit 100 shown in FIG. 1, the CPU architecture is configured to recognize and process such debug trigger control commands and then set the programmed values of the trigger registers 202–206 and trigger functional blocks 208–212. Because each trigger register 202–206 and each trigger functional block 208–212 may be programmed separately, the user has the ability to set a wide combination of trigger conditions for use in the testing and debugging process.

Figure 5:
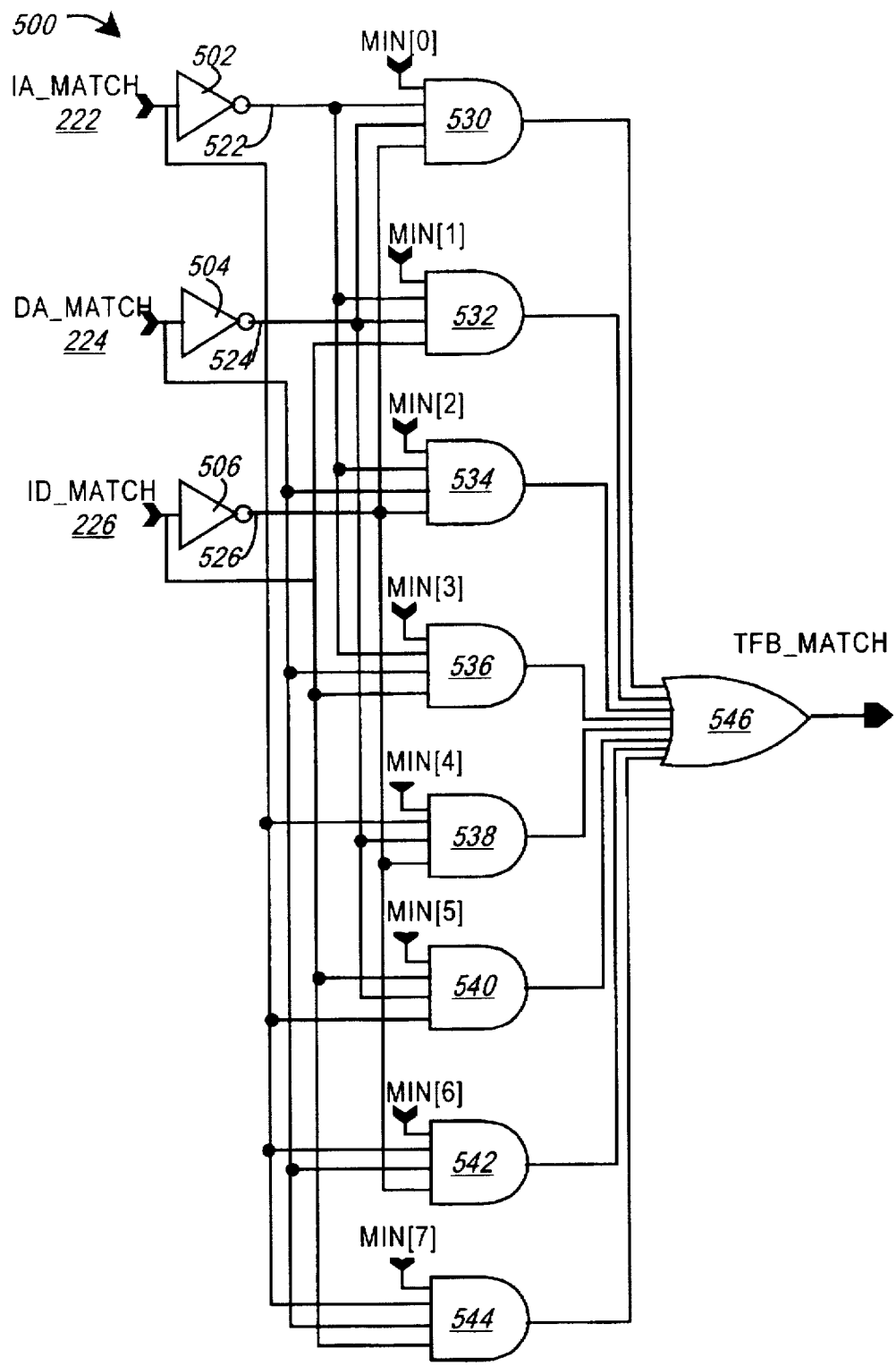
FIG. 5 is a schematic diagram of a trigger functional block used in the implementation of the preferred embodiment.

FIG. 5 is a schematic diagram of a trigger functional block 500 used to implement the trigger functional blocks 208–212 in the preferred embodiment. As shown in FIG. 5, the trigger functional block 500 receives the trigger match signals IA_MATCH 222, DA_MATCH 224 and ID_MATCH 226 from the trigger registers 202–206. Inverters 502, 504, 506 receive each of the trigger match signals 222–226 and produce inverted trigger match signals IA_MATCH' 522, DA_MATCH' 524, and ID_MATCH 526. Logical AND gates 530–544 each receive a different combination of inverted and non-inverted trigger match signals. In the trigger functional block 500, AND gate 530 receives IA_MATCH' 522, DA_MATCH' 524 and ID_MATCH' 526, while AND gate 544 receives IA_MATCH 322, DA_MATCH 324 and ID_MATCH 326. Each AND gate 530–544 also respectively receives a minterm selector signal min[0]–min[7]. The minterm selector signals min[0...7] are programmable and allow the user to define an arbitrary number of conditions upon which to signal a trigger capture event. If the minterm selector signal for a given AND gate is enabled (set to true), the AND gate will output a logical true signal if all of its inputs are true. If the minterm selector signal for a given AND gate is not enabled (set to false), the AND gate will output a logical false regardless of the state of its inputs. The outputs of each of the AND gates are Ored together by logical OR gate 546. If any of the AND gates outputs a logical true signal, the trigger function block match signal TFB_MATCH is true. The equation performed by the trigger functional block 500 is:

| TFB_MATCH = | MIN[0] | * IA_MATCH' | * DA_MATCH' | * ID_MATCH' + |
|---|---|---|---|---|
| | MIN[1] | * IA_MATCH' | * DA_MATCH' | * ID_MATCH + |
| | MIN[2] | * IA_MATCH' | * DA_MATCH | * ID_MATCH' + |
| | MIN[3] | * IA_MATCH' | * DA_MATCH | * ID_MATCH + |
| | MIN[4] | * IA_MATCH | * DA_MATCH' | * ID_MATCH' + |
| | MIN[5] | * IA_MATCH | * DA_MATCH' | * ID_MATCH + |
| | MIN[6] | * IA_MATCH | * DA_MATCH | * ID_MATCH' + |
| | MIN[7] | * IA_MATCH | * DA_MATCH | * ID_MATCH. |

All combinations of inputs are legal. Minterm values for some interesting combinations include: $0F_{hex}$ (Instruction Address), $55_{hex}$ (Instruction), 33hex (Data Address), and $7F_{hex}$ (either of Instruction Address, Instruction, or Data Address).

The preferred embodiment debug trigger apparatus 200 of FIG. 2 also includes additional components provided to increase its flexibility and sophistication. An iteration counter 214 is included to force N trigger matches before trigger capture events occur. The iteration counter 214 is configured to receive the trigger functional block signal 228 from trigger functional block 0 (TFB0) 208. The iteration counter 214 is programmable from the external data and address bus 132. The computer architecture of CPU 102 is configured to recognize and process iteration counter program commands and to set an iteration count value for the iteration counter 214. The iteration counter 214 produces an iteration count match signal 230 when the number of the trigger functional block signal 228 equals the programmed iteration count value. The preferred embodiment shown in FIG. 2 may also include a multiplexor 216 which is connected to receive the iteration count match signal 230 and an iteration counter output enable signal 232. The multiplexor 216 produces an enable signal 234 when either the iteration count match signal 230 or the iteration counter output enable signal 232 is both selected as input and is logically true. If it is not desired to count any iterations, the multiplexor 216 is selected to choose the iteration counter output enable signal 232, which is always logically true, as input. If iterations are to be counted, the multiplexor 216 is selected to choose the iteration count match signal 230 as input. The enable signal 234 is input to both the trigger functional block 1 (TFB1) and the trigger functional block 2 (TFB2) and used by their respective programmed functions in forming the respective trigger functional block signals 236, 242.

The debug trigger apparatus 200 of FIG. 2 also includes a countdown timer 218. The countdown timer is connected to receive the trigger functional block signal 236 from trigger functional block 1 (TFB1). The countdown timer 218 is programmable. The computer architecture of CPU 102 is configured to recognize and process countdown timer program commands and to set a countdown timer value for the countdown timer 218. The countdown timer 218 produces a countdown timer match signal 238 when a number of clock cycles pass which equals the programmed countdown timer value. Since the countdown timer counts only the number of clock cycles that pass, it is not dependent on the CPU pipeline or architectural functionality of the integrated circuit 100. The countdown timer 218 is therefore particularly useful in debugging electrical failures of the integrated circuit 100 because signals may be monitored for proper timing rather than only proper logical functionality. The preferred embodiment shown in FIG. 2 may also include a multiplexor 220 which is connected to receive the countdown timer match signal 238 and the trigger functional block signal 236. Multiplexor 220 may be selected to accept as input the trigger functional block signal 236 when no delay is desired or the countdown timer match signal 238 when additional delay is desired. The multiplexor 220 produces a trigger capture signal 240 when the selected input signal (i.e., the countdown timer match signal 238 or the trigger functional block signal 236) is logically true. In the preferred embodiment, the trigger capture signal 240 is used as an external pin pulse signal EP_SIGNAL, which is sent to the system interface 130 and made available external to the chip via external pin EP 138. The external pulse signal EP_SIGNAL indicates to an external test system that the test access port (TAP) latch 126 coupled to various test nodes throughout the integrated circuit has been latched and may be downloaded in a "sample-on-the-fly" manner to the external test system.

The trigger functional block 2 (TFB2) 212 of FIG. 2 directly produces a trigger capture signal 242. In the preferred embodiment, the trigger capture signal 242 is used as a hardware breakpoint trap, which may be used to cause a change in the program execution.

Figure 6:
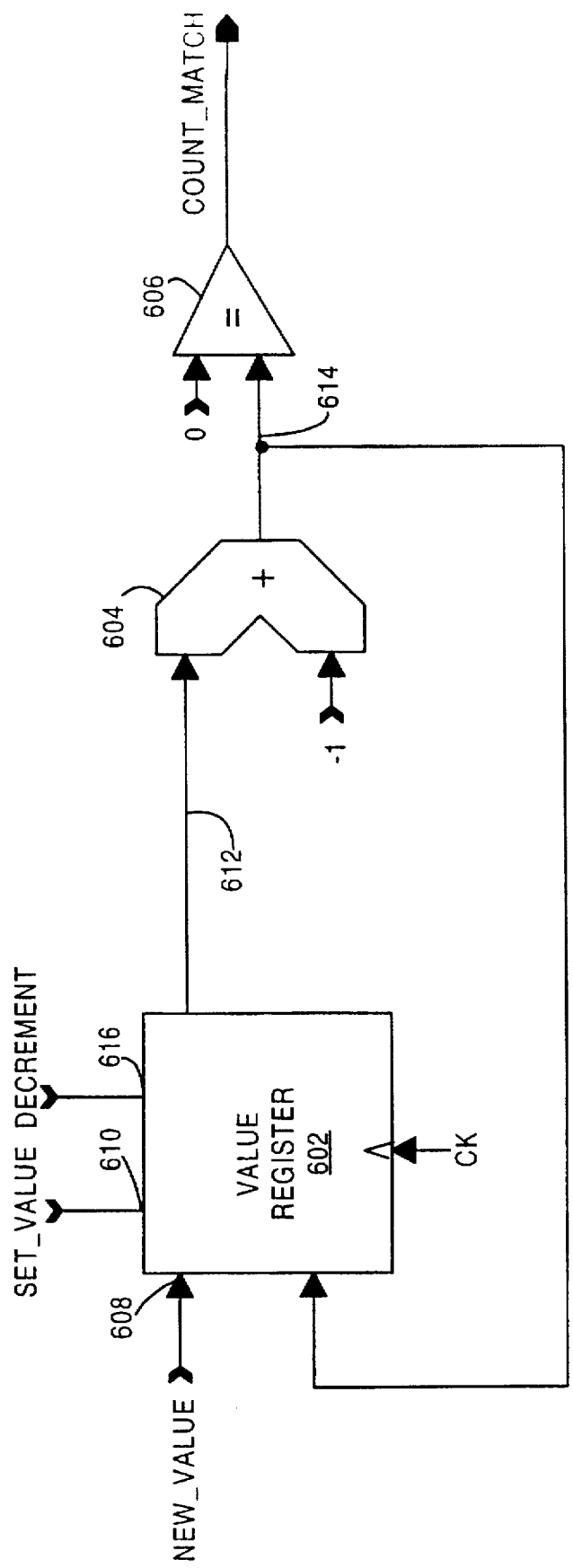
FIG. 6 is a schematic diagram of a counter used to implement the iteration counter and the countdown timer in the preferred embodiment.

FIG. 6 is a schematic diagram of a counter 600 used to implement the iteration counter 214 and the countdown timer 218 in the preferred embodiment. As shown in FIG. 6, the iteration counter 600 includes a 32-bit register 602, an adder 604, and a comparator 606. The register 602 may be programmed with a new value by placing the 32-bit value on input lines 608 and pulsing a set signal SET_VALUE on a set input 610. The register 602 is clocked by a clock signal CK, which outputs the contents of the register 602 on output lines 612 each clock cycle. The adder 604 receives the contents of the register 602 from lines 612, adds negative one, and outputs the a decremented value on lines 614. The comparator 606 receives the decremented value from lines 614, compares it to zero, and signals a count match signal COUNT_MATCH if the decremented value is equal to zero. The register 602 is also coupled to lines 614. If a decrement input 616 of the register 602 is high, the register 602 receives the decremented value as input when the clock signal CK clocks the register. When the counter 600 is used to implement the iteration counter 314, the decrement input 616 receives the direct output of trigger functional block TFB0 and thus counts down only on cycles when the TFB0 output signal is true. When the counter 600 is used to implement the countdown timer 318, the decrement input 616 of the register 602 is held low until trigger functional block TFB1 signals a match, and then the decrement input stays true until the timer reaches zero and COUNT_MATCH is signaled regardless of the state of TFB1.

FIG. 7 shows a table of the registers used to program each of the instruction address trigger register 202, data address trigger register 204, instruction data trigger register 206, trigger functional blocks 208–212, iteration counter 214, and countdown timer 218 of FIG. 2. As shown in FIG. 7, the diagnose registers include an instruction address trigger offset register IATOR DR0 and an instruction address trigger offset enable register IATOER DR1, an instruction address trigger space id register IATSIR DR2 and an instruction address trigger space id enable register IATSIRE DR3, an instruction address trigger real page number register IATRPN DR4 and an instruction address trigger real page number enable register IATRPNE DR5. The diagnose registers also include a data address trigger offset register DATOR DR6 and a data address trigger offset enable register DATOER DR7, and a data address trigger space id register DATSIR DR8 and a data address trigger space id enable register DATSIRE DR9. The diagnose registers also include an instruction trigger register ITR DR10 and an instruction trigger enable register ITER DR11. The diagnose registers also include an arbitrary function minterm selector (or trigger program) register TP DR14, an iteration counter register IC DR15, a countdown timer register CT DR16, and a trigger control register CR DR26. Registers DR0, 2, 4, 6, 8 and 10 correspond to the pattern latch 404 in FIG. 4. Registers DR 1, 3, 5, 7, 9 and 11 correspond to the mask latch 406 in FIG. 4. Register TP comprises the minterm bits min[0 . . . 7] for each of the trigger functional blocks TFB0, TFB1 and TFB2. The control register CR contains bits corresponding to the IA_PIPED, DA_PIPED and ID_PIPED signals among other control information. The diagnose registers are programmed by sending diagnose commands to the integrated circuit 100 on the data and address bus 134 to the system interface 130. The CPU architecture is configured to recognize and process the diagnostics commands and set up the diagnose registers accordingly.

Figure 8:
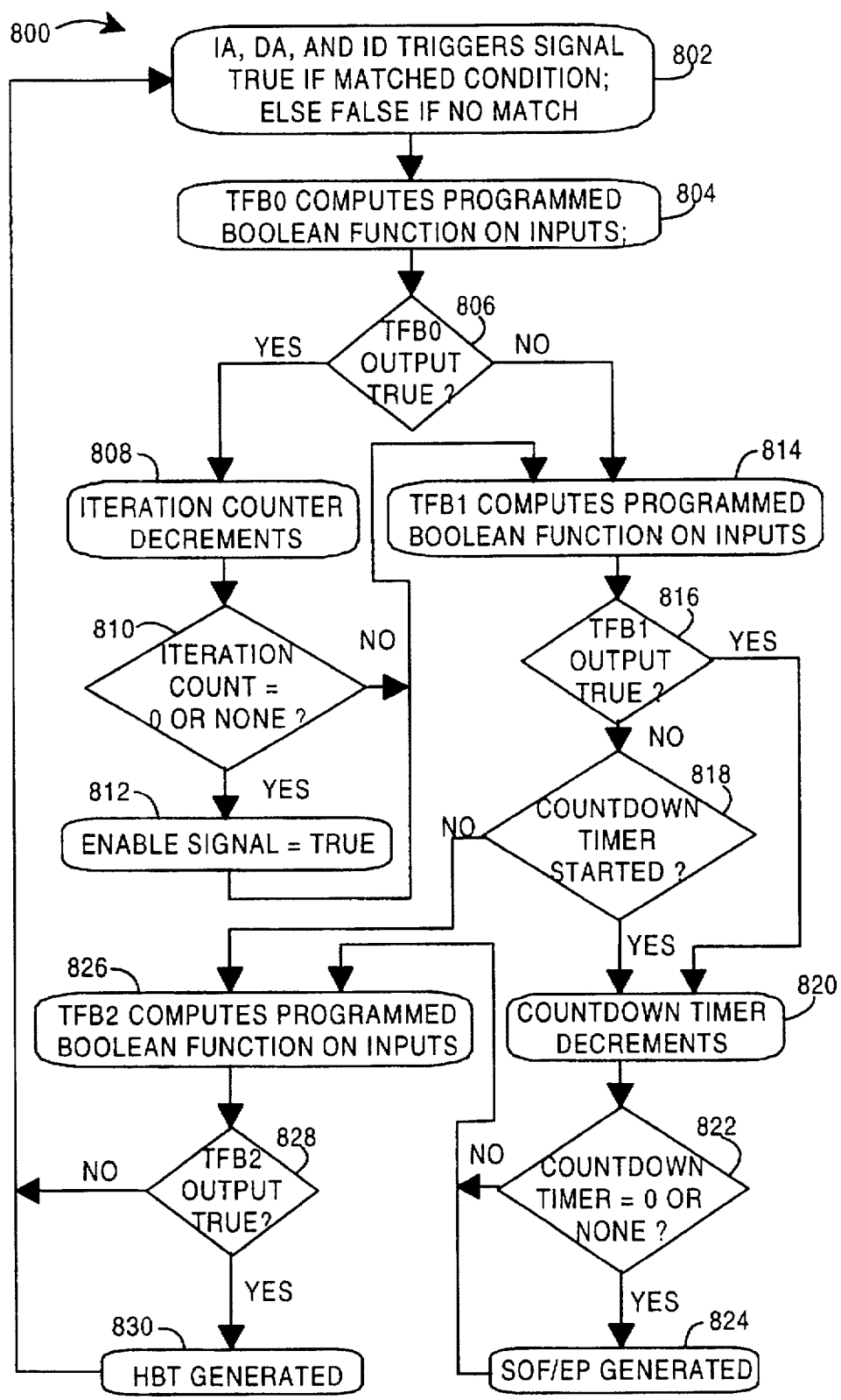
FIG. 8 is a flowchart of the debug trigger apparatus of FIG. 2 once the debug logic has been programmed.

FIG. 8 shows a flowchart of the operation, shown generally at 800, of the debug trigger apparatus of FIG. 2 once the debug logic has been programmed. As shown in FIG. 8, address (IA) trigger register 202, data address (DA) trigger register 204, and instruction data (ID) trigger register 206 begins with a step 802 in which each of the instruction address (IA) trigger register 202, data address (DA) trigger register 204, and instruction data (ID) trigger register 206 produce a logically true signal as its respective instruction address trigger match signal 222, data address trigger match signal 224, and instruction data trigger match signal 226 if its respective programmed trigger value matches the respective signals which it is configured to monitor. A logically false signal is respectively produced by the instruction address (IA) trigger register 202, data address (DA) trigger register 204, and instruction data (ID) trigger register 206 when no match occurs. The operation 800 of the debug trigger apparatus 200 continues in step 804 where trigger functional block 0 (TFB0) 208 computes its programmed boolean function of the three trigger register outputs 222–226. The trigger functional block 0 (TFB0) outputs a logically true trigger functional block signal 228 if the programmed function results in a logically true result, and outputs a logically false signal 228 if the programmed function results in a logically false result. In step 806, the debug trigger apparatus determines whether the trigger functional block signal 228 output by trigger functional block 0 (TFB0) is logically true. If the trigger functional block signal 228 is true, the debug trigger apparatus 200 decrements the iteration counter 214 by one in step 808. Then, in step 810 it is determined whether the iteration count has been decremented to 0 or whether there was no initial programmed iteration count. If either of these conditions is true, then in step 812 the iteration counter 214 outputs a logically true enable signal 234. If both of the conditions are false, the enable signal 234 is logically false. It will be noted that if no iteration count was programmed, the iteration counter 214 acts as a pass-through register and the first TFB0 match causes the enable signal 234 to be logically true.

The operation 800 of the debug trigger apparatus then continues in step 814 where trigger functional block 1 (TFB1) 210 computes its programmed boolean function of the enable signal 234 and the three trigger register outputs 222–226. In step 816, it is determined whether the output trigger functional block signal 236 is logically true or false. If the trigger functional block signal 236 is logically true, the countdown timer 218 is started if not yet started and then decremented in step 820. If the trigger functional block signal 236 is logically false, it is determined in step 818 whether the countdown timer had already been started previously. If the countdown timer 218 had already been started on a previous cycle, the countdown timer is decremented in step 820. If the countdown timer gets decremented in step 820, step 822 is executed in which it is determined whether the countdown timer has decremented to 0 or whether there was no delay initially programmed. If either of these conditions is true, a trigger capture signal 242 in the form of a sample-on-the-fly (SOF) signal or and external pin (EP) pulse signal is generated in step 824.

The operation 800 of the debug trigger apparatus 200 then continues in step 826 where trigger functional block 2 (TFB2) computes its programmed boolean function of the enable signal 234 and the three trigger outputs 222–226 from the trigger registers 202–206. In step 828 it is determined whether the trigger functional block signal 242 is true. If the trigger functional block signal 242 is true, a trigger capture signal 242 is generated in the form of a hardware breakpoint trap in step 830. Steps 802 through 830 are repeated each CPU clock cycle.

It will be appreciated from the above discussion that the present invention provides a sophisticated low-cost debug trigger apparatus for use in precise pinpointing of integrated circuit problems and failures. Internal integrated circuit signals may be monitored for use in testing and debugging integrated circuits. The present invention provides a set of trigger registers internal to the integrated circuit which can be software programmed to recognize a variety of conditions during the operation of the integrated circuit. The debug trigger apparatus provides significant flexibility in trigger conditions by allowing for repetition, different start and end conditions, arbitrary clock cycle delays before the final event, and trigger function blocks to form arbitrary boolean functions of the trigger conditions. The use of any two trigger function blocks provides the ability to specify different starting and ending conditions with an arbitrary number of matches on the start condition and an arbitrary delay on the end condition. The present invention thus provides a technique for applying the sophisticated functionality of powerful external debug tools to difficult-to-access external and inaccessible internal signals of an integrated circuit to detect an enormous number of arbitrary functional logic and electrical events.

It will also be appreciated by one skilled in the art that the principles of the present invention may be extended to include any number of combinations of trigger registers, trigger functional blocks, iteration counters and countdown timers. While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A debug trigger apparatus for use in debugging functional and electrical failures of an integrated circuit, comprising:

a plurality of programmable trigger registers disposed internal and integral to said integrated circuit, each trigger register configured to receive a plurality of integrated circuit signals, to compare each of said plurality of integrated circuit signals of said integrated circuit to a programmed trigger condition, and to produce a trigger match signal when said plurality of integrated circuit signals match said programmed trigger condition;

a plurality of programmable trigger function blocks disposed internal and integral to said integrated circuit, each trigger function block coupled to receive a plurality of said trigger match signals and performing a programmed boolean minterm function on the monitored trigger match signals to produce a trigger capture signal; and a programmable timer disposed internal and integral to said integrated circuit enabled by said trigger capture signal of a corresponding one of said programmable trigger function blocks to generate a timer enable signal upon completion of a programmed time delay.

2. The debug trigger apparatus of claim 1, wherein said programmed boolean minterm function is computed by performing a bit-wise logical AND of said plurality of said trigger match signals with a programmed bit mask to produce a bit-wise AND result, and then performing a bit-wise logical OR of bits in said bit-wise AND result to produce said trigger capture signal.

3. The debug trigger apparatus of claim 1, wherein each of said plurality of trigger registers comprise:

a sampler latch configured to sample said plurality of said integrated circuit signals according to a system clock signal and hold as output a sampled signal;

a pattern latch configured to set a programmable pattern value according to a set pattern program command and hold as output a pattern signal; and a comparator configured to compare said sampled signal and said pattern signal, and to output a trigger match signal when said sampled signal and said pattern signal match.

4. The debug trigger apparatus of claim 3, wherein each of said plurality of trigger registers further comprise:

a mask latch configured to set a programmable mask value according to a set mask program command and hold as output a mask signal;

wherein said comparator is configured to ignore, for comparison purposes, bits of said sampled signal and said pattern signal which are masked according to masked bits in said mask signal.

5. The debug trigger apparatus of claim 1, further comprising:

a programmable iteration counter disposed internal and integral to said integrated circuit and coupled to receive said trigger capture signal of a second corresponding one of said programmable trigger function blocks, said programmable iteration counter generating an iteration count enable signal upon receipt of said trigger capture signal of said second corresponding one of said programmable trigger function blocks a programmed iteration count number of times.

6. The debug trigger apparatus of claim 5, wherein one or more of the plurality of trigger function blocks is configured to further monitor said iteration counter enable signal and to include said iteration counter enable signal in performing said programmed boolean minterm function.

7. The debug trigger apparatus of claim 1, wherein said plurality of programmable trigger registers comprise an instruction address trigger register which is configured to monitor instruction addresses from an internal instruction address bus.

8. The debug trigger apparatus of claim 1, wherein said plurality of programmable trigger registers comprise a data address trigger register which monitors data addresses from an internal data address bus.

9. The debug trigger apparatus of claim 1, wherein said plurality of programmable trigger registers comprise an instruction data trigger register which monitors an instruction pattern on an internal instruction bus.

10. A debug trigger apparatus for use in debugging functional and electrical failures of an integrated circuit, comprising:

a plurality of programmable trigger registers disposed internal and integral to said integrated circuit, each trigger register configured to receive a plurality of integrated circuit signals, to compare each of said plurality of integrated circuit signals of said integrated circuit to a programmed trigger condition, and to produce a trigger match signal when said plurality of integrated circuit signals match said programmed trigger condition;

a plurality of programmable trigger function blocks disposed internal and integral to said integrated circuit, each trigger function block coupled to said plurality of trigger registers and receiving a plurality of said trigger match signals and performing a programmed boolean minterm function on the monitored trigger match signals to produce a trigger capture signal;

a programmable timer disposed internal and integral to said integrated circuit enabled by said trigger capture signal of a corresponding one of said programmable trigger function blocks to generate a timer enable signal upon completion of a programmed time delay; and a programmable iteration counter disposed internal and integral to said integrated circuit and coupled to receive said trigger capture signal of a second corresponding one of said programmable trigger function blocks, said programmable iteration counter generating an iteration count enable signal upon receipt of said trigger capture signal of said second corresponding one of said programmable trigger function blocks a programmed iteration count number of times.

11. The debug trigger apparatus of claim 10, said plurality of programmable trigger function blocks comprising a first trigger function block, a second trigger function block, and a third trigger function block, wherein each produces respectively a first trigger capture signal, a second trigger capture signal, and a third trigger capture signal.

12. The debug trigger apparatus of claim 11, wherein said iteration counter is configured to receive the first trigger capture signal from said first trigger function block.

13. The debug trigger apparatus of claim 12, wherein said first and second trigger function blocks are further configured to monitor and use said iteration count enable signal to perform their respective programmed boolean minterm functions.

14. The debug trigger apparatus of claim 13, wherein said programmable timer is configured to receive said second trigger capture signal from said second trigger function block.

15. The debug trigger apparatus of claim 13, wherein said plurality of trigger registers comprise an instruction address trigger register which monitors instruction addresses from an internal instruction address bus and produces an instruction address trigger match signal, a data address trigger register which monitors data addresses from an internal data address bus and produces a data address trigger match signal, and an instruction data trigger register which monitors an instruction pattern on an internal instruction bus and produces an instruction data trigger match signal.

16. The debug trigger apparatus of claim 10, wherein each of said plurality of programmable trigger registers comprise:

a sampler latch configured to sample said plurality of integrated circuit signals according to a system clock signal and hold as output a sampled signal;

a pattern latch configured to set a programmable pattern value according to a set pattern program command and hold as output a pattern signal; and a comparator configured to compare said sampled signal and said pattern signal, and to output a trigger match signal when said sampled signal and said pattern signal match.

17. The debug trigger apparatus of claim 16, wherein each of said plurality of trigger registers further comprise:

a mask latch configured to set a programmable mask value according to a set mask program command and hold as output a mask signal;

wherein said comparator is configured to ignore, for comparison purposes, bits of said sampled signal and said pattern signal which are masked according to masked bits in said mask signal.

* * * * *